United States Patent [19]

Romi

[11] Patent Number: 4,577,529
[45] Date of Patent: Mar. 25, 1986

[54] GEAR TRANSMISSION ASSEMBLY

[76] Inventor: Romeu Romi, Av. Perola Byington 56, Santa Barbara d'Oeste C., Brazil

[21] Appl. No.: 412,852

[22] Filed: Aug. 30, 1982

[51] Int. Cl.[4] ............................................. F16H 37/06
[52] U.S. Cl. .................. 74/665 GA; 74/331; 74/342; 74/344
[58] Field of Search ......... 74/665 GA, 665 F, 665 G, 74/331, 341, 342, 343, 344, 345, 333

[56] References Cited

U.S. PATENT DOCUMENTS

| | | | |
|---|---|---|---|
| 1,269,944 | 6/1918 | Leonard | 74/343 X |
| 2,456,894 | 12/1948 | Ryker | 74/331 X |
| 2,947,190 | 8/1960 | Johnson | 74/331 X |
| 3,364,793 | 1/1968 | Eastwood | 74/342 X |
| 4,273,007 | 6/1981 | Sato et al. | 74/331 X |

FOREIGN PATENT DOCUMENTS

| | | | |
|---|---|---|---|
| 896914 | 11/1953 | Fed. Rep. of Germany | 74/331 |
| 185241 | 7/1955 | Fed. Rep. of Germany | 74/342 |
| 943089 | 5/1956 | Fed. Rep. of Germany | 74/342 |
| 1058376 | 5/1959 | Fed. Rep. of Germany | 74/343 |
| 67525 | 3/1951 | Netherlands | 74/331 |
| 687854 | 2/1953 | United Kingdom | 74/342 |
| 301482 | 4/1971 | U.S.S.R. | 74/333 |

*Primary Examiner*—William F. Pate, III
*Assistant Examiner*—Joseph M. Rolnicki
*Attorney, Agent, or Firm*—Michael J. Striker

[57] ABSTRACT

A "GEAR TRANSMISSION ASSEMBLY" or more precisely a speed change gear box with two output shafts being one main and the other secondary for driving machine tools and mechanical equipment in general, with different alternative arrangements of the speed system in a total of either seventeen different speeds, fourteen different speeds, thirteen different speeds or ten different speeds in the main output shaft consisting of a set of five slidable gears and a set of gears twice double (four gears) also slidable being one of the double sets comprised of two single gears assembled together totalling only fifteen gears and three shafts to obtain seventeen different speeds in said main output shaft. A second output shaft or secondary output shaft makes possible the output of speeds in a ratio equal to or different from the speeds of the main output shaft.

10 Claims, 7 Drawing Figures

GEAR TRANSMISSION ASSEMBLY

BACKGROUND OF THE INVENTION

The present invention refers to a gear transmission assembly or more precisely to a speed change gear box with primary and secondary outputs, for driving machine tools and mechanical equipment in general. This assembly is something completely new in its kind even when the most advanced techniques known today are considered.

Several types of speed change gear boxes have been known. All of them use a considerable number of shafts, gears and control elements in accordance with the number of speeds on the main output shaft, thus requiring a lot of space inside the boxes to accommodate all these components. Usually, in these speed boxes each gear has a single function, either to receive rotating movement from a driving gear, to transmit rotating movement to a driven gear or to act as an intermediate element for transmitting rotating movement. The lack of multiple functions for the same components results in the consequent need for a larger number of components, the use of more space, and therefore higher manufacturing costs for the assembly.

SUMMARY OF THE INVENTION

It is an object of the invention to provide a speed gear box that besides using a small number of components and consequently being less costly, makes possible at least four different alternative set ups of the speed system totalling: either 17 different speeds, or 14 different speeds, or 13 different speeds, or 10 different speeds so as to form a plurality of systems of different speeds on the main output shaft with geometric escalation and a secondary output shaft with three output ratios in respect to the main output speed, being one ratio 1:1 and the other two ratios an exact multiple of 2.

Another object of the invention is to provide a speed gear box with an arrangement of the transmission elements and the gear meshing conditions of the systems of 10, 13, 14 and 17 speeds which enables several gears of the system to be reused. That is, the same component part has multiple functions as a consequence of its multiple utilization (and reutilization) which results in a reduction of shafts, bearings, gears, control elements and other components in respect to the normally needed for speed systems with equivalent results as far as the number of obtainable speeds when compared to the known constructions in accordance with the present state of the art.

It is a further object of the invention to provide a speed gear box in which several gears have multiple applications enabling to obtain in one of the possible alternatives 17 different speeds in the main output shaft while requiring only 15 gears, 3 shafts and 2 shifting levers.

Still another object of the invention is to provide a speed gear box with two output shafts with an assembly of five gears mounted on the input primary shaft which gears can be meshed with the intermediate shaft gears so that it provides speeds with a geometrical step equal to $\phi^2$ (Phi$^2$). Another assembly consists of four gears (twice double) mounted on the third shaft or main output shaft which gears can be meshed with the intermediate shaft gears so that using one of the double gears provides a step equal to $\phi^9$ (Phi$^9$) between the two engagements of this double gear. When the other double gear is engaged, it provides a $\phi^5$ (Phi$^5$) step between the two engagement of this double gear resulting in a $\phi^3$ (Phi$^3$) step between the lower speeds of the two double gears. This double gear consists of a two single gears assembled together that enables its application as a double gear and as an alternative as two single gears so that with the use of one or the other, 14 or 13 different speeds in the main output shaft can be obtained. The gears comprising the two assemblies of double gears are shiftable by independent means (fork shifting) so that it is assured that when one means (fork) of shifting is in operation the other (fork) is prevented from shifting and remains at neutral position.

Yet another object of the invention is to provide a system to obtain 20 shifting possibilities resulting in 17 different speeds in the main output shaft with the use of only 15 gears and 3 shafts and resulting in a gear ratio equal to $\phi^{17}$ (Phi$^{17}$). The (Phi) system (geometrical progression) is constant from the second up to the last output speed. The step from the first to the second speed is equal to $\phi^2$ (Phi$^2$) which makes possible a low initial speed and a wide gear ratio equal to $\phi^{17}$ (Phi$^{17}$). The system for the secondary output shaft with the use of a change gear enables an output ratio of 1:1 and outputs with exact multiples of 2. The referred change gear can be engaged to a gear that is mounted at the end of the third or main output shaft so that the result is an output ratio equal to 1:1 to this shaft and alternatively it may engage to one of the intermediate shaft gears resulting in output speeds with two ratios which are exact multiples of 2. When the referred gear of the secondary output shaft is engaged in a position which resulting output speed is a multiple of 2 even if it remains at this position, and if on the primary output shaft the gear is engaged which results in the condition of higher speed rate, the secondary output shaft will be rotating at a ratio of 1:1 to the primary output shaft.

It is to be emphasized that the variable $\phi$ is a constant value for each particular transmission. The input and output ratio of the transmission increases by a certain multiple or power of $\phi$ for each consecutive gear engaged.

A further object of the invention is that the primary and secondary output shafts can be located at any side of the box even one opposite to the other depending on the gear box application.

Still a further object of the invention as mentioned before is to provide besides the 17 different speeds other possible alternatives making possible to obtain 14, 13 and 10 different speeds in the main output shaft. By using one of the gears of the double gear, 14 different speeds can be obtained in the main output shaft resulting in a geometrical progression with step equal $\phi^2$ (Phi$^2$) from the first up to the fifth speed and $\phi$ (Phi) from the fifth up to the fourteenth speed. Using another of the gears of the double gear, 13 different speeds can be obtained in the main output shaft in a geometrical progression with step equal to $\phi^2$ (Phi$^2$) from the first up to the second speed $\phi$ (Phi) from the second up to the ninth speed and again $\phi^2$ (Phi$^2$) from the ninth up to the thirteenth speed. These 14 and 13 different speeds can also be obtained by joining said single gears with the first set of double gears already mentioned, making a set of triple gears, and in this case eliminating one of the shifting forks. By eliminating said double gears consisting of two single gears mounted together, 10 different speeds can be obtained in the main output shaft with a geometrical progression with step equal to $\phi^2$ (Phi$^2$) from the first up to the fifth speed $\phi$ (Phi) from the fifth up to the sixth speed, and again $\phi^2$ (Phi$^2$) from the sixth up to the tenth speed.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
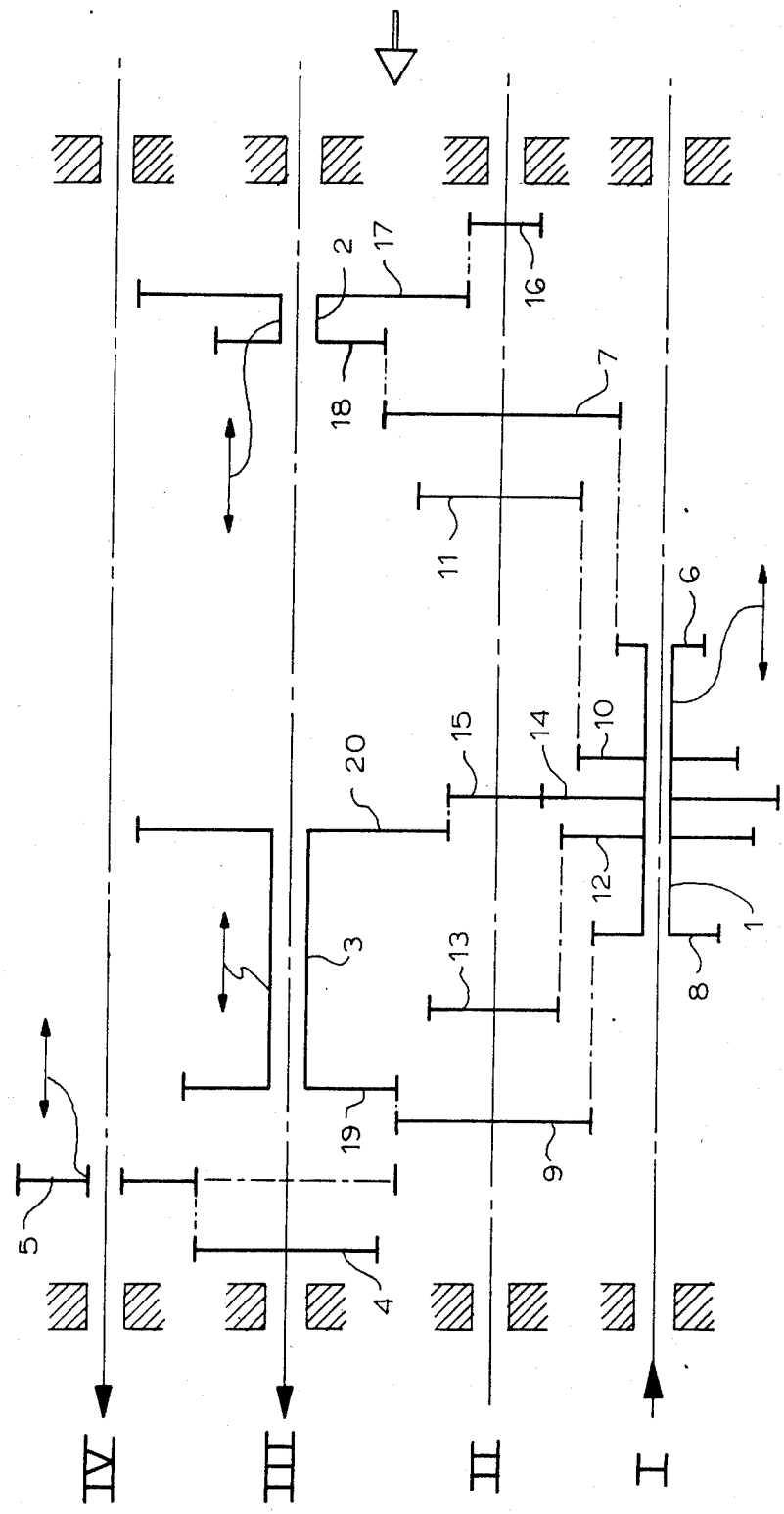
FIG. 1 is the kinematic chain arranged for 17 different speeds in the main output shaft III.

As illustrated in the drawings, the invention refers to a gear transmission assembly or more precisely to a speed change gear box with two output shafts in which the power input is provided through primary splined shaft I on which a set of five gears slidable over said splined shaft I are mounted with the possibility of taking five positions along the shaft. In each of the five positions of said gear set, one of its gears engages one of the gears of intermediate shaft II transmitting to this shaft five different speeds on a geometrical progression with step equal to $\phi^2$ (Phi$^2$) between each speed, resulting in a total step of $\phi^8$ (Phi$^8$). When gear 6 of shaft I is engaged gear 7 of shaft II, the first speed (the lowest speed) is transmitted to shaft II. Displacing axially the set of five gears 1 along shaft I, the other speed ratios are obtained successively at shaft II at the time the other gears of shafts I and II are engaged. The speed of shaft II increases progressively in respect to the starting speed of $\phi^2$ (Phi$^2$) when gears 8 and 9 are engaged; $\phi^4$ (Phi$^4$) when gears 10 and 11 are engaged; $\phi^6$ (Phi$^6$) when gears 12 and 13 are engaged, and finally $\phi^8$ (Phi$^8$) when gears 14 and 15 are engaged. In one of the alternatives, when the two double gears slidably mounted on shaft III engage gears of shaft II, the speeds of this shaft are transmitted to said shaft III with a step of $\phi^9$ (Phi$^9$) when the engagement of gears 16 and 17 goes over to the engagement of gears 7 and 18; and a step of $\phi^5$ (Phi$^5$) when engagement of gears 9 and 19 goes over to the engagement of gears 15 and 20. With the five combinations obtainable by means of pairs of gears on shafts I and II, and the four combinations of pairs of gears on shafts II and III twenty possibilities are obtained on shaft III (third or main output shaft) resulting in 17 different speeds maintaining a step of $\phi^2$ (Phi$^2$) between the first and second speeds, and constant $\phi$ (Phi) between the second and seventeenth speeds with a total gear ratio of $\phi^{17}$ (Phi$^{17}$). When gears 4 and 5 are engaged, shaft IV (second output shaft) turns with the same speed of shaft III, that is, at a ratio of 1:1. When gear 5 is displaced axially along shaft IV and engaged to gear 9 of shaft II, second output shaft IV may turn at the same speed of shaft III, that is, at a ratio of 1:1 when gears 18 and 7 are engaged, or in a ratio multiple of 2 when gears 17 and 16 are engaged. Also, when gears 20 and 15, and gears 5 and 9 are engaged, the speed of second output shaft IV will be higher than the speed of shaft III in a ratio multiple of 2, however, it is different from the situation when gears 17 and 16 are engaged. In the present arrangement, several components have more than one function so that the same component is used several times to make possible, with small number of gears, shafts, bearings and shifting levers attaining a greater number of different speeds. As can be understood from the following description, several gears of shaft II are either reducing gears or intermediate gears depending on the position of engagement of change gears of shafts I and III. Gears 7 and 15 have a double function. Gear 7 has the function of a speed reducing gear when it receives power from gear 6 and power is transferred to shaft III through gears 16, 15 and 9. Gear 7 has the function of intermediate or idle gear when it receives power from gear 6 and transfers it to gear 18 of shaft III. Gear 15 has the function of a speed reducing gear when it receives power from gear 14 and power is transferred to shaft III through gears 16, 7 and 9; and said gear 15 has the function of intermediate or idle gear when it receives power from gear 14 and transfers it to gear 20 of shaft III. Gear 9 has three different functions. It has the function of a speed reducing gear when it receives power from gear 8 and this power is transferred to shaft III through gears 15, 7 and 16; said gear 9 has the function of an intermediate or idle gear when it receives power from gear 8 and transfers it to gear 19 of shaft III; and, finally, said gear 9 has the function of transferring power to gear 5 of second output shaft IV.

Figure 2:
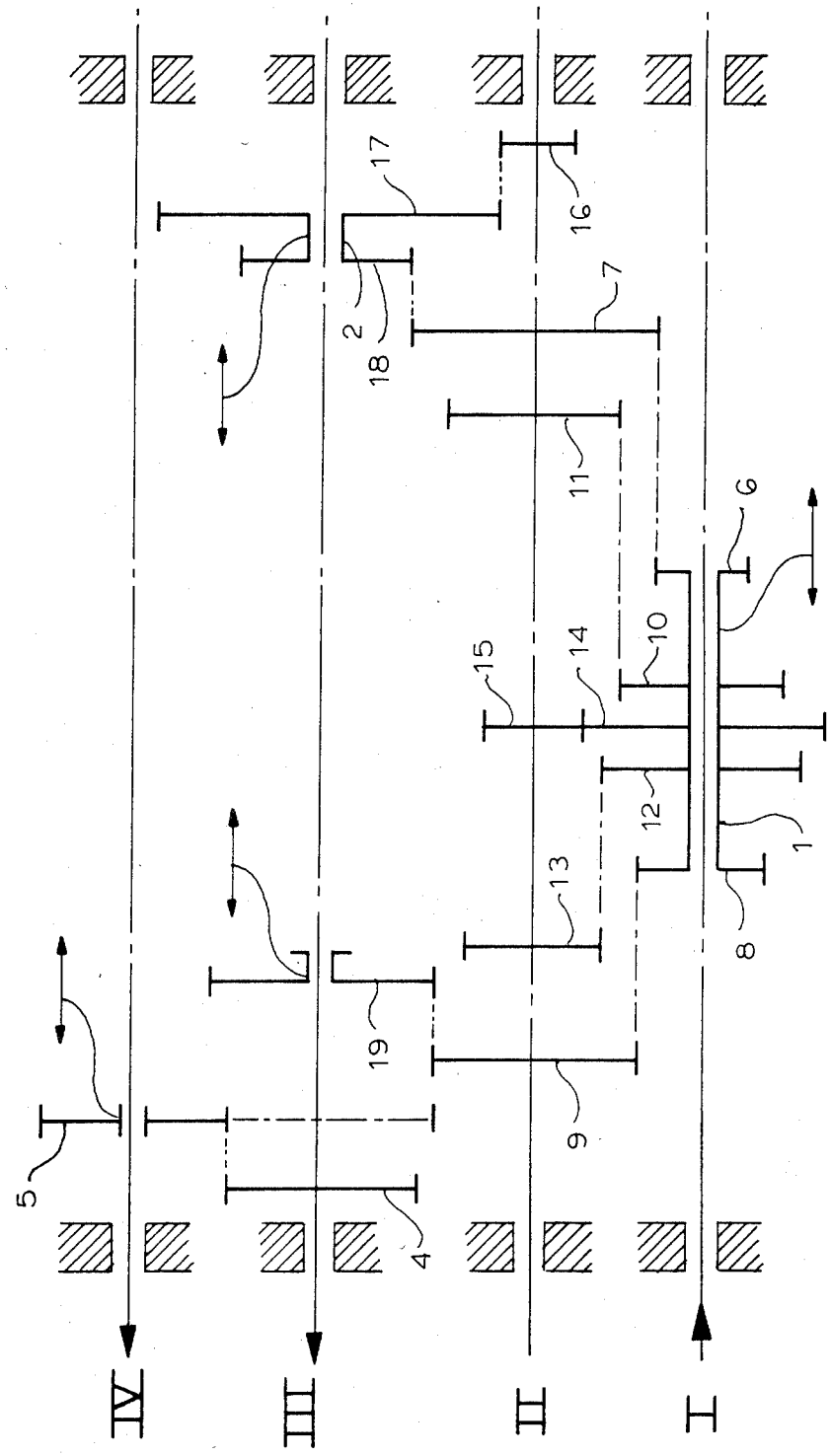
FIG. 2 is the first alternative of the kinematic chain arranged for 14 different speeds in the main output shaft III.
Figure 3:
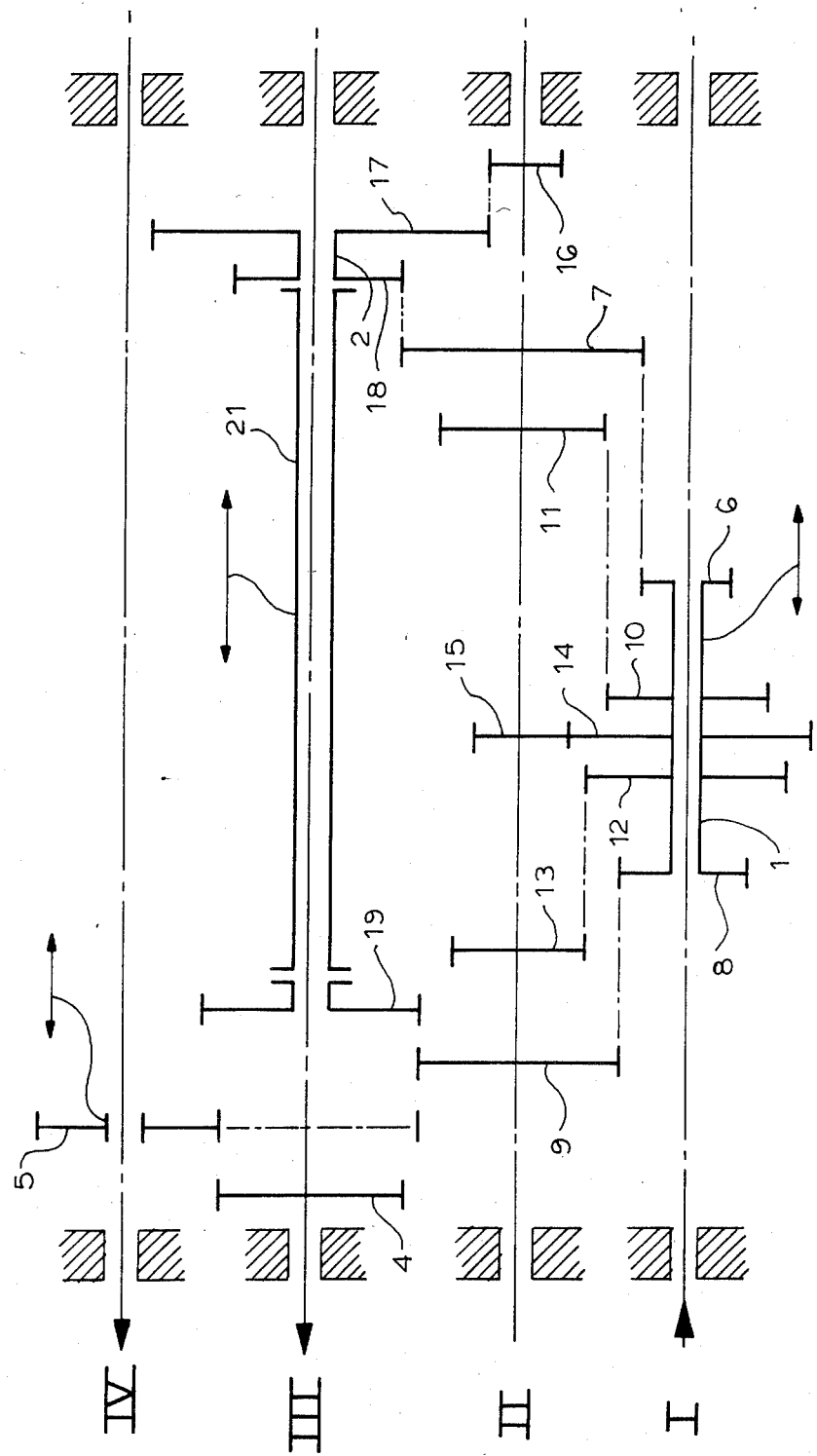
FIG. 3 is the second alternative embodiment of the kinematic chain arranged for 14 different speeds in the main output shaft III.

Another alternative is obtained by utilizing gear 19 (FIG. 2) of the double gear 3 and repeating all engagements of the set if five gears 1 and engagement of double gear 2 already described. The combination of speeds resulting from those engagements combined with the engagement of gear 19 enables 15 possibilities of combinations resulting in 14 different speeds in the main output shaft with a $\phi^2$ (Phi$^2$) progression between the first and fifth speeds and $\phi$ (Phi) between the fifth and fourteenth speeds. This same number of speeds is obtained by joining gear 19 with double gear 2 forming a set of triple gears 21 (FIG. 3). Although the result is the same either by utilizing gear 19 (FIG. 2) of double gear 3, separated from double gear 2 or joining gear 19 with double gear 2. This last alternative has the advantage of reducing the number of control elements, that is, shifting forks, blocking elements, etc., rendering manufacture of the assembly more economical.

Figure 4:
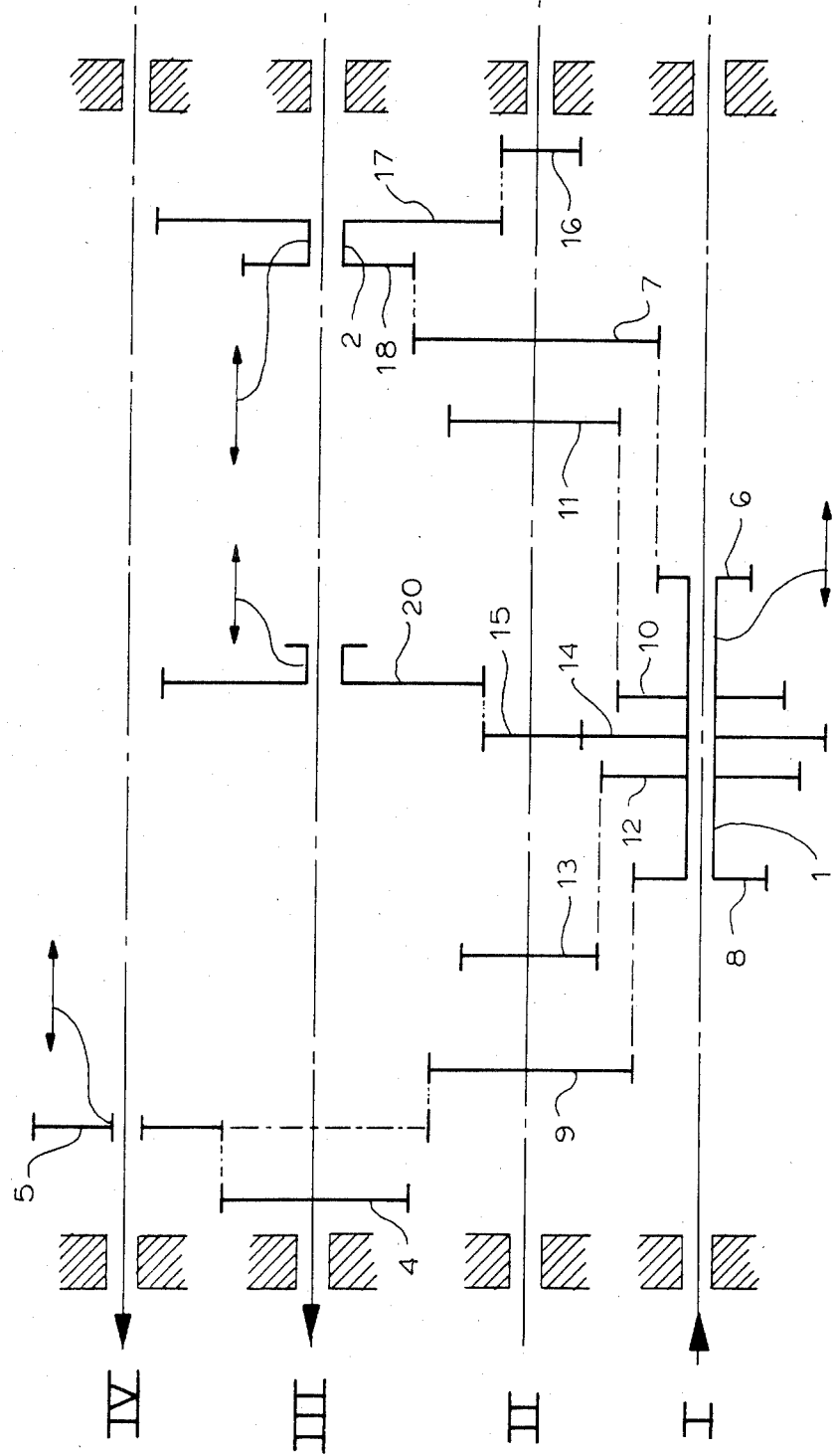
FIG. 4 is the first alternative of the kinematic chain arranged for 13 different speeds in the main output shaft III.
Figure 5:
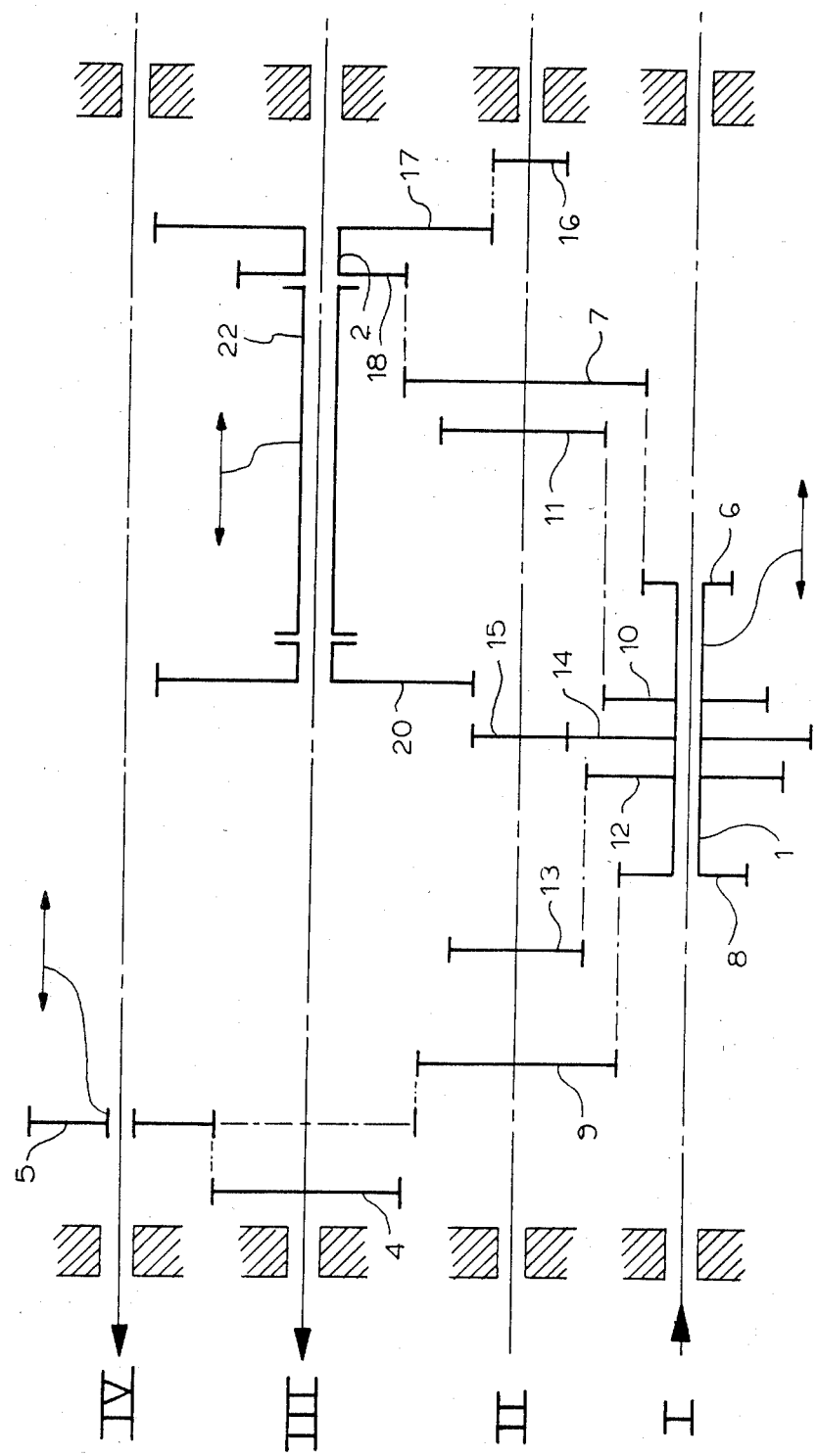
FIG. 5 is the second alternative of the kinematic chain arranged for 13 different speeds in the main output shaft III.

Another alternative is obtained by utilizing gear 20 (FIG. 4) of the double gear 3 and repeating all engagements of the set of five gears 1 and double gear 2. The combination of speeds resulting from these engagements combined with engagement of the gear 20 enables 15 possibilities of combinations resulting in 13 different speeds in the main output shaft with $\phi^2$ (Phi$^2$) progression between the first and second speeds. $\phi$ (Phi) between the second and ninth speeds and again $\phi^2$ (Phi²) between the ninth and thirteenth speeds. This same number of speeds is obtained by joining gear 20 with double gear 2 forming a set of three gears 22 (FIG. 5) although the result is the same either by utilizing gear 20 (FIG. 4) of the double gear 3 separated from double gear 2 or joining gear 20 with double gear 2. This last alternative has the advantage of reducing the number of control elements, that is, shifting forks, blocking elements, etc., rendering the manufacture of the assembly more economical.

Figure 6:
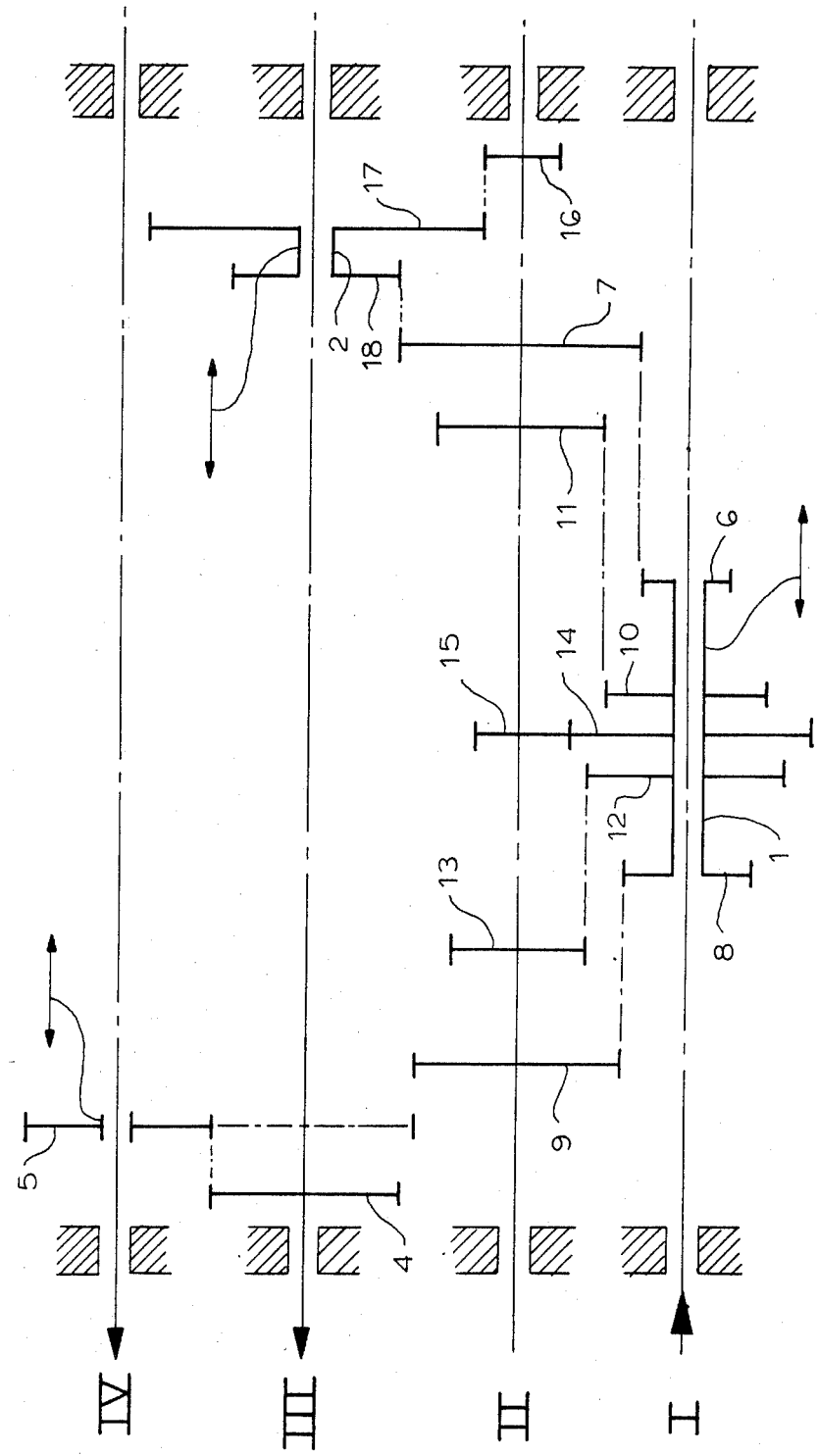
FIG. 6 is the kinematic chain arranged for 10 different speeds in the main output shaft III.
Figure 7:
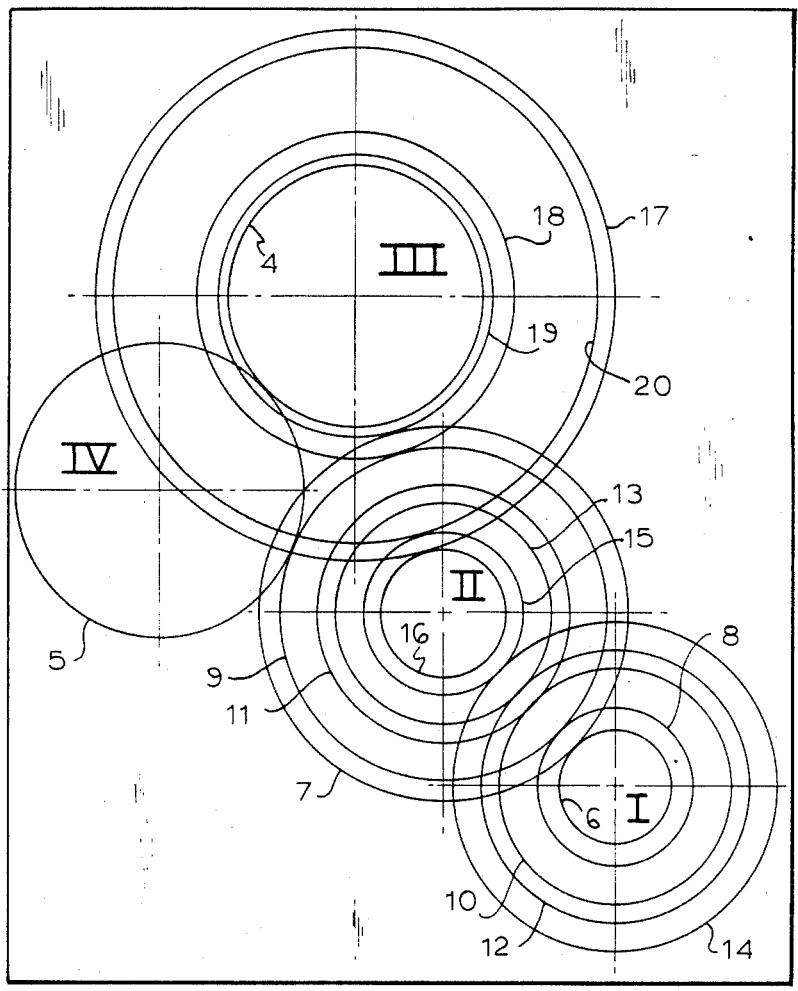
FIG. 7 is the side view of FIG. 1.

Still another condition can be obtained by eliminating double gear 3 as illustrated in FIG. 6. With the five engagements of the set of five gears 1 and two engagements of double gear 2, 10 possibilities of combinations can be obtained resulting in 10 different speeds in the main output shaft with a $\phi^2$ (Phi²) progression between the first and fifth speeds, $\phi$ (Phi) between the fifth and sixth speeds and again $\phi^2$ (Phi²) between the sixth and tenth speeds.

While the invention has been illustrated and described as embodied in a gear transmission assembly, it is not intended to be limited to the details shown, since various modifications and structural changes may be made without departing in any way from the spirit of the present invention.

Without further analysis, the foregoing will so fully reveal the essence of the present invention that others by applying current knowledge, can readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A gear transmission assembly, comprising a speed change gearbox including a drive shaft, an intermediate shaft, set of five slideable gears for driving said intermediate shaft from said drive shaft, a first driven shaft, two slideable double gears constrained for rotation with said first driven shaft, a secondary driven shaft with a 1:1 gear ratio in relation to said first driven shaft and another gear ratio, a multiple of 2 in relation to the first driven shaft, six non-slideable gears constrained for rotation with said intermediate shaft of which four non-slidable gears are selectively meshable with corresponding sliding gears on said drive shaft and with corresponding double gears slideable on said first driven shaft, a slideable gear constrained for rotation with said secondary driven shaft and alternatively meshable with one of said four non-slideable gears constrained for rotation with said intermediate shaft, and said gears constrained for rotation with said drive, said intermediate shaft and said first driven shaft producing 17 different output speeds on said first driven shaft.

2. A gear transmission assembly as defined in claim 1, wherein said gears and shafts include only 15 gears and four shafts so as to obtain said 17 different speeds at said first driven shaft.

3. A gear transmission asssembly as defined in claim 1, wherein at least some non-slideable gears constrained for rotation with said intermediate shaft is arranged for a multiply use so as to maintain a constant gear ratio in geometric progression at a step equal to $\phi$ through the second a speed up to 17th speed of said 17 speeds, and a step equal to $\phi^2$ between a first and the second speed of said 17 speeds.

4. A gear transmission assembly as defined in claim 1, wherein said gears are arranged so as to provide a speed range with a final gear ratio equal to $\phi^{17}$ and 16 steps between a first and a 17th speed of said 17 speeds.

5. A gear transmission assembly as defined in claim 1, wherein the gears of said set of five gears are arranged so as to form a change in gear ratio which is always equal to $\Phi^2$ between the consecutively engaged speeds when engaging the gears of said set of five gears.

6. A gear transmission assembly as defined in claim 1, wherein each of said slideable double gears constrained for rotation with said first driven shaft and selectably meshable with each one of said non-slideable gears constrained for rotation with said intermediate shaft are arranged so that one of said double gears provides a step equal to $\phi^9$ wherein the other of said double gears provides a step equal to $\phi^5$.

7. A gear transmission assembly as defined in claim 6, wherein each of said double gears has a smaller gear and a larger gear formed so that a step equal to $\phi^3$ is provided when disengaging the larger gear of one of said double gears and engaging the larger gear of the other of said double gears, and vice versa.

8. A gear transmission assembly as defined in claim 6, wherein each of said double gears has a smaller gear and a larger gear formed so that a step equal to $\phi$ is provided when disengaging the smaller gear of one of said double gears and engaging the smaller gear of the other of said double gears, and vice versa.

9. A gear transmission assembly as defined in claim 1; and further comprising a non-slideable gear arranged on said first driven shaft, said slideable gear constrained for rotation with said secondary driven shaft being meshable with said non-slideable gear arranged on said first driven shaft with a gear ratio equal to 1:1 and alternatively meshable with one of said gears constrained for rotation with said intermediate shaft with a gear ratio equal to 2:1 and other gear ratios multiple of 2 in relation to said 2 driven shafts, depending on which gear of said intermediate shaft and corresponding gear of the driven shaft are in mesh.

10. A gear transmission assembly as defined in claim 1, wherein said gears are formed so as to obtain output speeds which are exact multiples of 2, depending on whether said slideable gear constrained for rotation with said secondary driven shaft is engaged with one of said non-slideable gears constrained for rotation with said intermediate shaft, another of said non-slideable gears constrained for rotation with said intermediate shaft is engaged with one of said slideable double gears constrained for rotation with said first driven shaft, or a further of said non-slideable gears constrained for rotation with said intermediate shaft is engaged with the other of said slideable double gears constrained for rotation with said first driven gear shaft.

* * * * *